(12) United States Patent
Beall

(10) Patent No.: US 10,894,304 B2
(45) Date of Patent: Jan. 19, 2021

(54) SYSTEM FOR IMAGE GUIDED ASSEMBLY AND A FASTENING TOOL FOR ASSEMBLY OF A STRUCTURE

(71) Applicant: Bell Helicopter Textron Inc., Fort Worth, TX (US)

(72) Inventor: Grant M. Beall, Arlington, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 0 days.

(21) Appl. No.: 16/140,122

(22) Filed: Sep. 24, 2018

(65) Prior Publication Data

US 2020/0094365 A1 Mar. 26, 2020

(51) Int. Cl.
| B25B 23/18 | (2006.01) |
| B23Q 17/24 | (2006.01) |
| B64F 5/10 | (2017.01) |
| B25B 23/10 | (2006.01) |
| B25J 1/04 | (2006.01) |
| B33Y 80/00 | (2015.01) |

(52) U.S. Cl.
CPC .......... *B23Q 17/2409* (2013.01); *B25B 23/10* (2013.01); *B25B 23/18* (2013.01); *B64F 5/10* (2017.01); *B23P 2700/01* (2013.01); *B25J 1/04* (2013.01); *B33Y 80/00* (2014.12)

(58) Field of Classification Search
CPC ....... B23Q 17/2409; B64F 5/10; B25B 23/10; B25B 23/18; B23P 2700/01; B33Y 80/00; B25J 1/04
See application file for complete search history.

(56) References Cited

U.S. PATENT DOCUMENTS

| 5,155,941 | A | * | 10/1992 | Takahashi | ............ | A61B 1/0051 |
| | | | | | | 408/16 |
| 5,349,940 | A | * | 9/1994 | Takahashi | ........ | A61B 17/32002 |
| | | | | | | 356/241.4 |
| 8,051,547 | B2 | | 11/2011 | Toh et al. | | |
| 9,248,759 | B2 | | 2/2016 | Brand et al. | | |
| 9,435,750 | B2 | * | 9/2016 | Matsumoto | .......... | G01N 21/954 |
| 2008/0155807 | A1 | | 7/2008 | Toh et al. | | |
| 2014/0115869 | A1 | | 5/2014 | DeLand et al. | | |

OTHER PUBLICATIONS

Office Action, dated Mar. 14, 2011, by the USPTO, re U.S. Appl. No. 11/618,431.

* cited by examiner

*Primary Examiner* — Rick K Chang
(74) *Attorney, Agent, or Firm* — Timmer Law Group, PLLC

(57) ABSTRACT

A system for image guided assembly of a structure, the structure defining an interior area accessible through at least one access opening, the interior area including at least one fastener hole. The system including a first fastening tool including an arm with first and second ends; and a support plate on the first end, the support plate including at least one connection member to securely retain a fastener therein, the at least one connection member configured to facilitate alignment of the fastener with the at least one fastener hole; an image capturing device disposed on the arm first end configured to generate a captured image of the interior area; a light source associated with the arm first end, the light source configured to generate light at the first end of the arm; and a display device located outside the interior area for displaying the captured image of the interior area.

21 Claims, 6 Drawing Sheets

SYSTEM FOR IMAGE GUIDED ASSEMBLY AND A FASTENING TOOL FOR ASSEMBLY OF A STRUCTURE

BACKGROUND

Technical Field

The present disclosure relates to image guided assembly of a structure, and, more particularly to image guided assembly of an aircraft structure having at least one interior area accessible through at least one access opening.

Description of Related Art

Oftentimes manufacture and maintenance of complicated structures, such as aircraft, require multiple fasteners to be installed and torqued at a remote distance within an interior cavity or channel. Some fasteners may be within the reach of the operator. However, there are situations where the fasteners must be installed and torqued beyond the reach of an operator. In these situations, components of the structure may need to be removed so the operator can reach further into the cavity or channel to set the fastener in the remote location. The manual methods of setting fasteners at a remote distance within an interior cavity or channel can be time consuming, expensive, and manpower-intensive. In some instances, the fastener may get dropped and lost inside the aircraft, which can cause foreign object damage to interior area. Accordingly, there is a need for a system, method, and apparatus that assists the operator in setting fasteners at a remote distance within an interior cavity or channel without the necessity of removing components and/or the operator entering into the interior of the structure.

SUMMARY

In a first aspect, there is provided a system for image guided assembly of a structure, the structure defining an interior area accessible through at least one access opening, the interior area including at least one fastener hole, the system including a first fastening tool. The first fastening tool comprising an arm including a first end and a handle disposed on a second end opposite the first end, at least a portion of the arm located inside the interior area, the handle located outside the interior area and guides the arm into the interior area through the at least one access opening; and a support plate disposed on the first end of the arm, the support plate comprising at least one connection member to securely retain a fastener therein, the at least one connection member configured to facilitate alignment of the fastener with the at least one fastener hole. The system further including: an image capturing device disposed on the first end of the arm configured to generate a captured image of the interior area; a light source associated with the first end of the arm, the light source configured to generate light at the first end of the arm; and a display device located outside the interior area for displaying the captured image of the interior area.

In an embodiment, the arm comprises a curvature shaped to correspond to the interior area.

In an illustrative embodiment, the arm is rigid.

In an exemplary embodiment, the arm is formed from an additive manufacturing process.

In an embodiment, the additive manufacturing process comprises at least one of the following: electron beam melting, selective laser sintering, selective laser melting, stereolithography, direct metal laser sintering, three-dimensional printing, fused deposition modeling, laser curing and lasered engineered net shaping.

In another embodiment, the at least one connection member comprises a recess with at least one protrusion therein to temporarily retain at least one fastener therein.

In still another embodiment, an arrangement of the at least one connection member on the support plate is tailored to align with the at least one fastener hole.

In an embodiment, the image capturing device comprises at least one of the following: a visible light video camera, an infrared camera, and a heat sensitive camera.

In an exemplary embodiment, the image capturing device comprises a borescope camera including a lens assembly and a mirror oriented to reflect an image of the at least one fastener hole.

In yet another embodiment, the image capturing device is configured to be adjustable by receiving a video input from the operator to adjust the captured image.

In an embodiment, the light source is disposed on a side of the support plate.

In another embodiment, the light source comprises a laser for generating an optical beam of light to assist with positioning of the fastening tool in the interior area.

In an embodiment, the display device is at least one of a desktop computer, a laptop computer, a tablet computer, and a cellular phone.

In an exemplary embodiment, the system further includes a second fastening tool.

In a second aspect, there is provided a fastening tool for assembly of a structure, the structure defining an interior area accessible through at least one access opening, the interior area including at least one fastener hole, the tool including an arm including a first end and a handle disposed on a second end opposite the first end, at least a portion of the arm located inside the interior area, the handle located outside the interior area and guides the arm into the interior area through the at least one access opening; and a support plate disposed on the first end of the arm, the support plate comprising at least one connection member to securely retain a fastener therein, the at least one connection member configured to facilitate alignment of the fastener with the at least one fastener hole.

In an embodiment, the arm comprises a curvature shaped to correspond to the interior area.

In another embodiment, the arm is rigid.

In yet another embodiment, the at least one connection member comprises a recess with at least one protrusion therein to temporarily retain at least one fastener therein.

In still yet another embodiment, an arrangement of the at least one connection member on the support plate is tailored to align with the at least one fastener hole.

In a third aspect, there is provided a method for image guided assembly of a structure, the structure defining an interior area accessible through at least one access opening, the interior area including at least one fastener hole, the method comprising: providing a fastening tool, the fastening tool comprising: an arm including a first end and a handle disposed on a second end opposite the first end, at least a portion of the arm located inside the interior area, the handle located outside the interior area and guides the arm into the interior area through the at least one access opening; and a support plate disposed on the first end of the arm, the support plate comprising at least one connection member to securely retain a fastener therein, the at least one connection member configured to facilitate alignment of the fastener with the at least one fastener hole. The method further comprising: securing a fastener in the at least one connection member;

placing the first end of the fastening tool in the interior area; obtaining a captured image of the interior area; positioning the fastening tool based upon the captured image such that the fastener is adjacent to the at least one fastener hole such that the fastener is aligned to be received therein; and fastening the fastener in the at least one fastener hole which also releases the fastener from the connection member in the support plate.

In an embodiment, the step of fastening is achieved by securing the fastener in the at least one fastener hole from outside the interior area.

In another embodiment, the at least one connection member comprises a recess with at least one protrusion therein to temporarily secure the fastener therein.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of systems, methods, and apparatuses for image guided assembly are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction. The terms "disengage" and "remove" and derivatives thereof are used synonymously herein and should be understood broadly to include any loosening, separating, detaching, releasing, freeing, disconnecting, uncoupling, and/or undoing, whether partially or wholly, of one component from another component.

It will be appreciated that the present invention can be used for assembly in wide variety of manufacturing applications. One application that is particularly well suited for the present invention is the assembly of internal components in the wings, fuselage, and nacelles of tiltrotor aircraft. Thus, although the present invention will be described with respect to the assembly of a structure for an aircraft, it should be understood that the present invention may be used in any industry and/or manufacturing or maintenance application in which assembly is required at a remote distance within an interior area.

Figure 1:
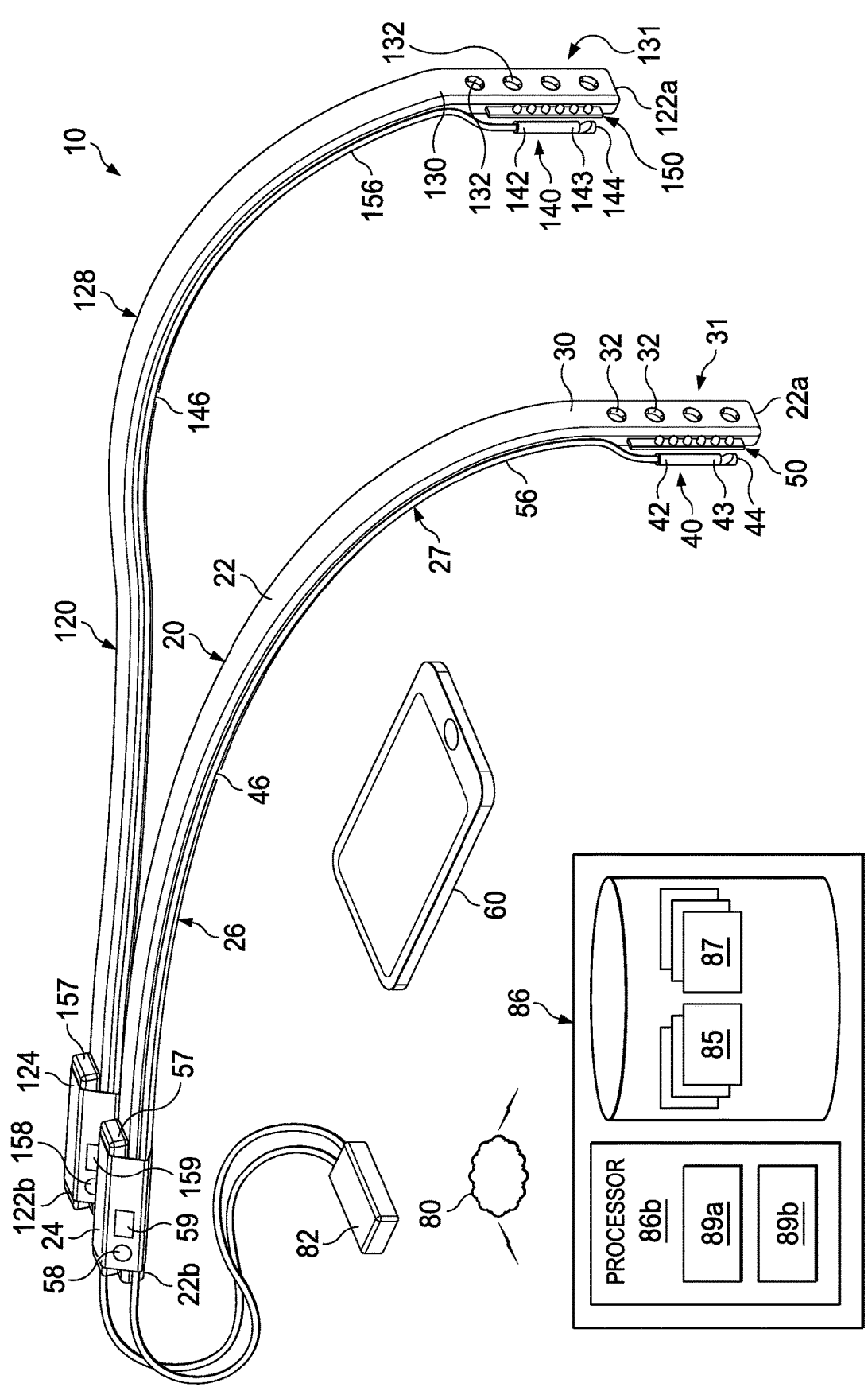
FIG. 1 is a perspective view of a system for image guided assembly of a structure, according to one example embodiment.
Figure 3:
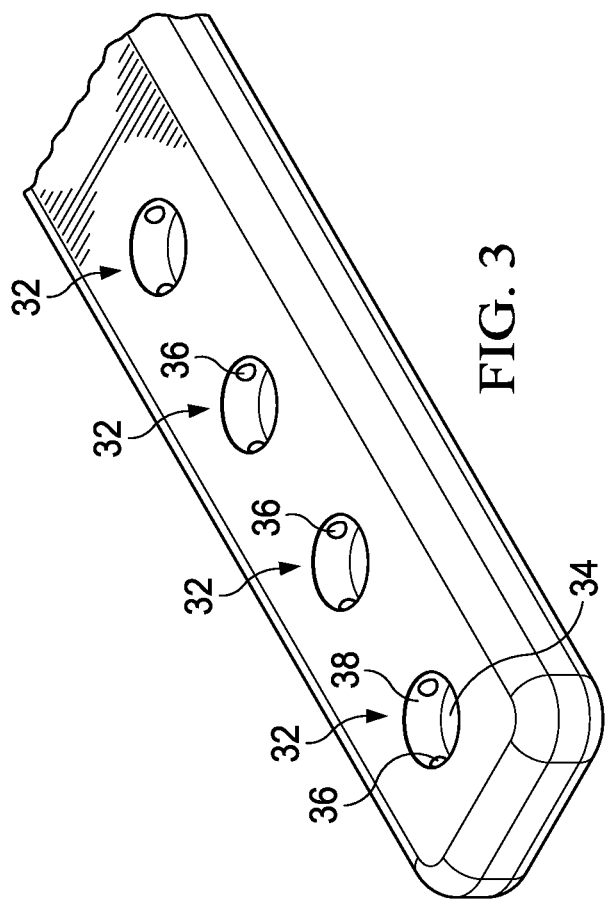
FIG. 3 is a perspective view of the support plate in FIG. 2.
Figure 8:
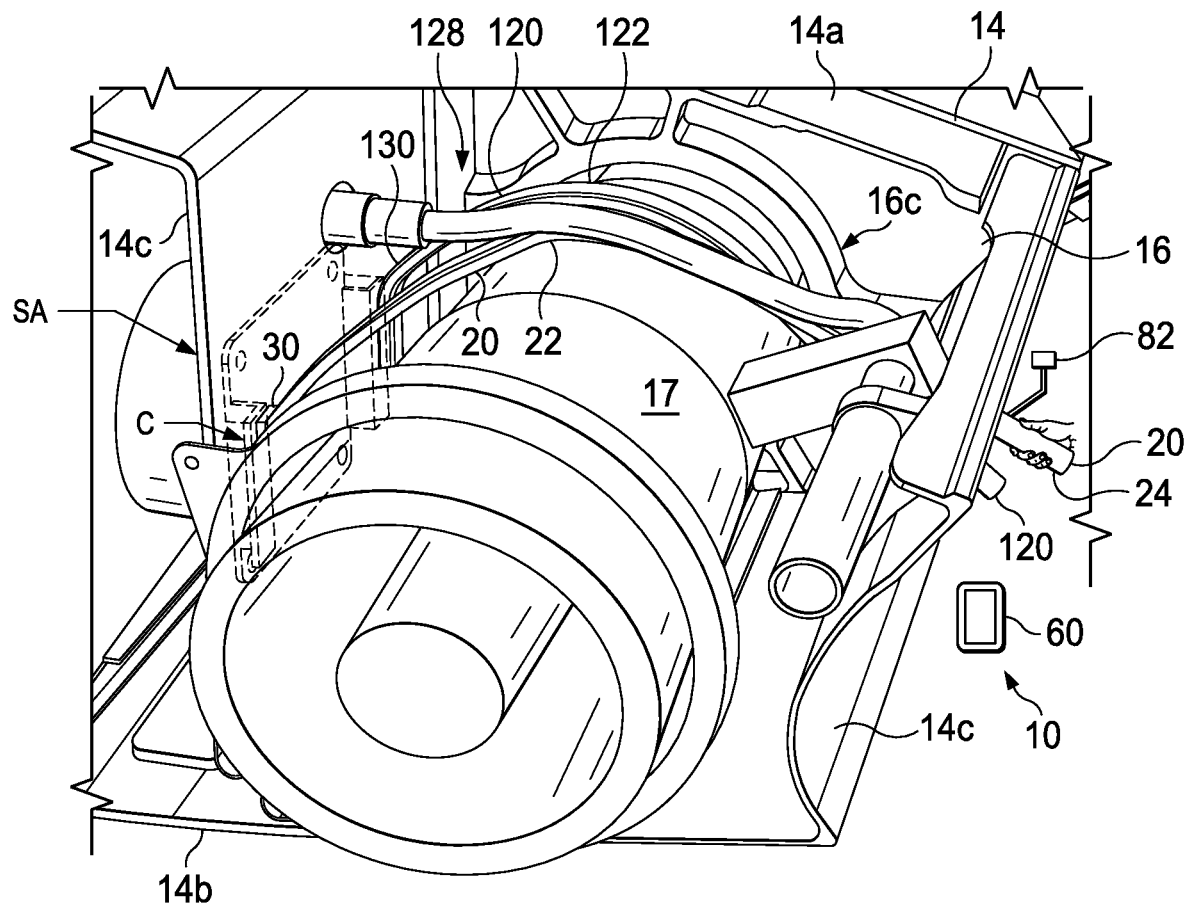
FIG. 8 is an illustration of the system including first and second fastening tools in an interior area of an aircraft structure having an internal component therein, according to an illustrative embodiment.
Figure 9A:
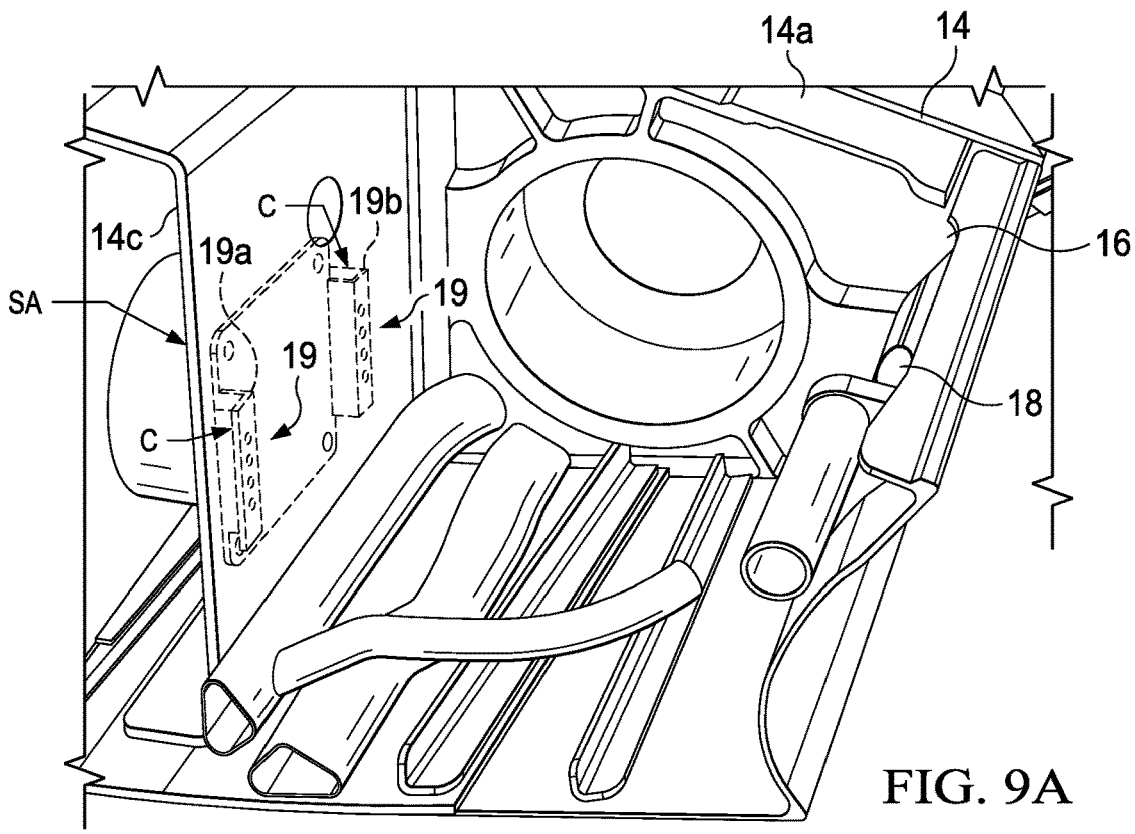
FIG. 9A is an illustration of the aircraft structure in FIG. 8 with the internal component removed to show at least one fastener holes in the first and second side brackets.
Figure 9B:
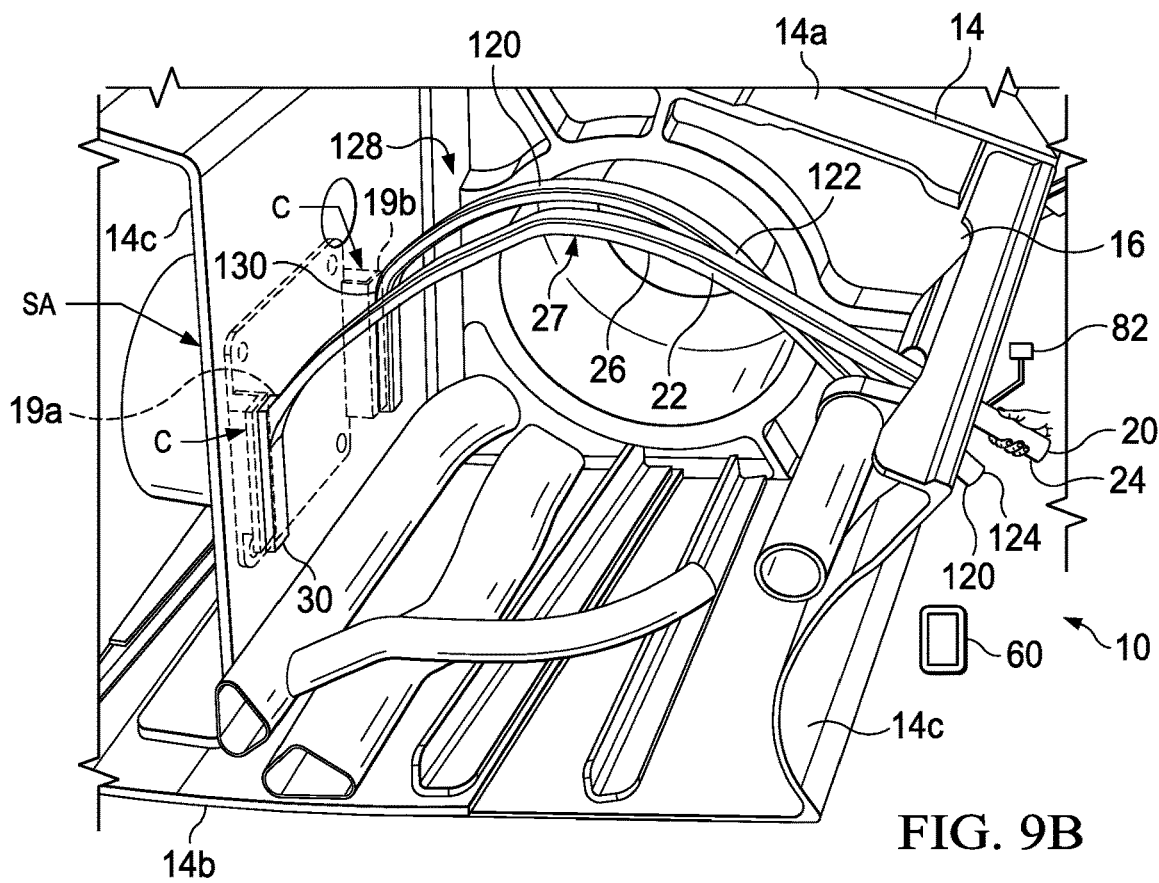
FIG. 9B is an illustration of the system in FIG. 9A with the support plates of the first and second fastening tools aligned with the at least one fastener holes for installation of the fasteners.

In an embodiment, there is provided a system 10 for image guided assembly of structure, as shown in FIG. 1. The system 10 can be used in a structure, as shown in FIGS. 8 and 9A-9B, such as a wing box 14 for a tiltrotor aircraft. The wing box 14 includes an upper cover 14a, a lower cover 14b, and side members 14c that define an interior area 16 accessible through at least one access opening 18. The configuration of the interior area 16 can include at least one of: an internal component 17 therein, a cavity therein, and a channel therein. In an illustrative example, as shown in FIGS. 8 and 9A-8B, the interior area 16 includes a cavity 16c disposed between the upper cover 14a, side walls 14c, and the internal component 17 (internal component not shown in FIG. 9).

The system 10 includes a first fastening tool 20, an image capturing device 40, a light source 50, and a display device 60. In some embodiments, the system 10 further includes a second fastening tool 120. Certain components of the second fastening tool 120 are as described in connection with the first fastening tool 20. Those components bear similar reference characters to the components in the first fastening tool 20 but with a leading '1'.

The first fastening tool 20 includes an arm 22 and a support plate 30. The arm 22 includes a first end 22a and a handle 24 disposed on a second end 22b opposite the first end 22a. The handle 24 guides the arm 22 into the interior area 16 through the access opening 18 to position the support plate 30 adjacent to at least one fastener hole 19, as shown in FIGS. 9A-9B, in the interior area 16 of the structure 14.

The curvature 26 of arm 22 is shaped to correspond to the interior area 16. In an embodiment, the curvature 26 of arm 22 is configured to permit the arm 22 to be positioned through the access opening 18 and into the interior area 16 such that the support plate 30 aligns with at least one fastener hole 19. In an embodiment, as shown in FIGS. 1, 8, and 9A-9B, the first fastening tool 20 includes a first curvature 27 that is straight and extends downward such that the support plate 30 aligns with the holes 19 in the first side bracket 19a, while the second fastening tool 120 includes a second curvature 128 that has an outward bend that extends downward such that the support plate 130 aligns with the holes 19 in the second side bracket 19b. It should be noted that the first and second curvatures 27, 128 of the first and second fastening tools 20, 120 are merely examples of the curvature 26 of the arm 22 and that other shapes and geometries (e.g., downward, upward, left, right, straight portions) are possible as determined by the configuration of the interior area 16.

In some illustrative embodiments, the arm 22 is rigid. Rigid means that the arm 22 is strong and stiff and prevents uncontrolled and excessive range of motion while being positioned in the interior area 16. In some embodiments, arm 22 is inflexible. In some embodiments, the arm 22 is semi-rigid such that the arm 22 has a degree of flexibility and to flex and conform to the interior area 16 during placement therein.

In an exemplary embodiment, arm 22 is formed from an additive manufacturing process. The additive manufacturing process can include at least one of the following: electron beam melting (EBM), selective laser sintering (SLS), selective laser melting (SLM), stereolithography, direct metal laser sintering (DMLS), three-dimensional printing (3DP), fused deposition modeling (FDM), laser curing, and lasered engineered net shaping (LENS).

TABLE 1

Exemplary additive manufacturing methods for forming arm 22

| Technique | Brief description of technique and related notes |
|---|---|
| CNC | CNC refers to subtractive manufacturing, which can be computer numerically controlled (CNC) machine tools, a computer driven technique, e.g., computer-code instructions, in which machine tools are driven by one or more computers. |
| Binder Jetting | Binder Jetting refers to an additive manufacturing technology. Binder Jetting uses layers of powder and a binder deposited onto the powder as opposed to heat. |
| Rapid proto-typing | Rapid prototyping refers generally to automated construction of prototype or product using an additive manufacturing technology such as EBM, SLS, SLM, SLA, DMLS, 3DP, FDM, and other technologies. |
| EBM ® | EBM ® refers to electron beam melting, which is a powder-based additive manufacturing technology. Typically, successive layers of metal powder are deposited and melted with an electron beam in a vacuum. |
| SLS | SLS refers to selective laser sintering which is a powder-based additive manufacturing technology. Typically, successive layers of a powder (e.g., polymer, metal, sand, or other material) are deposited and melted with a scanning laser, for example a carbon dioxide laser. |
| SLM | SLM refers to selective laser melting, which is an additive manufacturing technology similar to SLS; however, with SLM the powder material is fully melted to form a fully dense product. |
| SLA or SL | SLA or SL refer to stereolithography, which is a liquid-based additive manufacturing technology. Typically, successive layers of a liquid resin are exposed to a curing, for example, UV laser light, to solidify each layer and bond it to the layer below. This technology typically requires the addition and removal of support structures when creating particular geometries. |
| DMLS | DMLS refers to direct metal laser sintering, which is a powder-based additive manufacturing technology. Typically, metal powder is deposited and melted locally using a fiber optic laser. Complex and highly accurate geometries can be produced with this technology. This technology supports net-shaping, which means that the product generated from the technology requires little or no subsequent surface finishing. |
| LC | LC refers to LaserCusing ®(LC), which is a powder-based additive manufacturing technology. LC is similar to DMLS; however, with LC a high-energy laser is used to completely melt the powder, thereby creating a fully-dense product. |
| 3DP | 3DP refers to three-dimensional printing (3DP), which is a high-speed additive manufacturing technology that can deposit various types of materials in powder, liquid, or granular form in a printer like fashion. Deposited layers can be cured layer by layer or, alternatively for granular deposition, an intervening adhesive step can be used to secure layered granules together in a bed of granules, which can be used to form multiple layers subsequently cured together, for example, with laser or light curing. |

TABLE 1-continued

Exemplary additive manufacturing methods for forming arm 22

| Technique | Brief description of technique and related notes |
|---|---|
| LENS | LENS ® refers to Laser Engineered Net Shaping ™, which is a powder-based additive manufacturing technology. Typically, metal powder is supplied to the focus of the laser beam at deposition head. The laser beam melts the powder as it is applied, in raster fashion. The process continues layer by layer and requires no subsequent curing. This technology supports net-shaping, which means that the product generated from the technology requires little or no subsequent surface finishing. |
| FDM | FDM refers to fused deposition modeling ™ (FDM) is an extrusion-based additive manufacturing technology. Typically, beads of heated extruded polymers are deposited row by row and layer by layer. The beads harden as the extruded polymer cools. |

In an exemplary embodiment, arm 22 is formed of nylon by an SLS method. In an embodiment, the arm 22 is formed as a monolithic piece having an elongated shape. As noted above, arm 22 can be formed of other materials such as at least one of a polymer, metal, sand, and other substances suitable for an arm 22 having a tailored curvature 26.

Now referring to FIGS. 1-7, the support plate 30 includes at least one connection member 32 to securely retain a fastener 48 therein. The least one connection member 32 is configured to facilitate alignment of the fastener 48 to at least one fastener hole 19. Fastener 48 can be a hardware device that mechanically joins or affixes two or more components together and may include bolts, nuts, washers, screws, pins, blind threaded fasteners (for example, but not limitation, HI-LITE™ pins and collars, HI-LOK™ fastening systems), etc. Fastener 48 means at least one fastener and, in some embodiments, fastener 48 means a plurality of fasteners.

Figure 4:
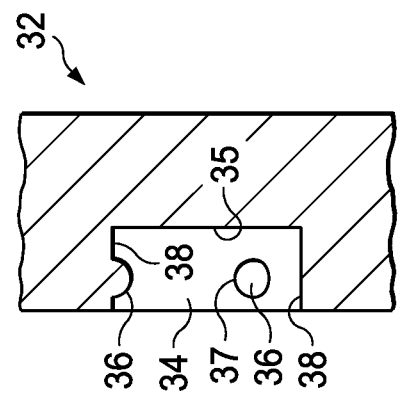
FIG. 4 is an enlarged, cross sectional view of at least one connection member disposed on the support plate of FIG. 2 taken along the line 4-4.
Figure 2:
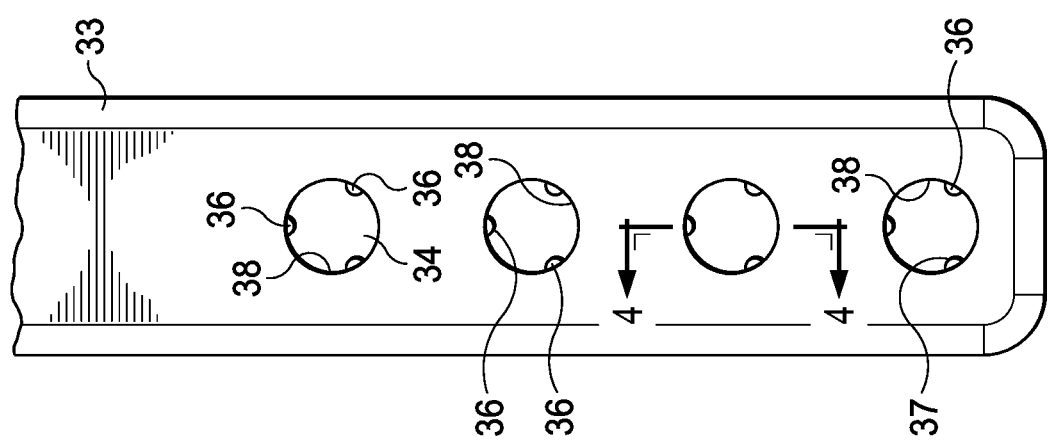
FIG. 2 is front view of a support plate of a fastening tool, according to one example embodiment.
Figure 5:
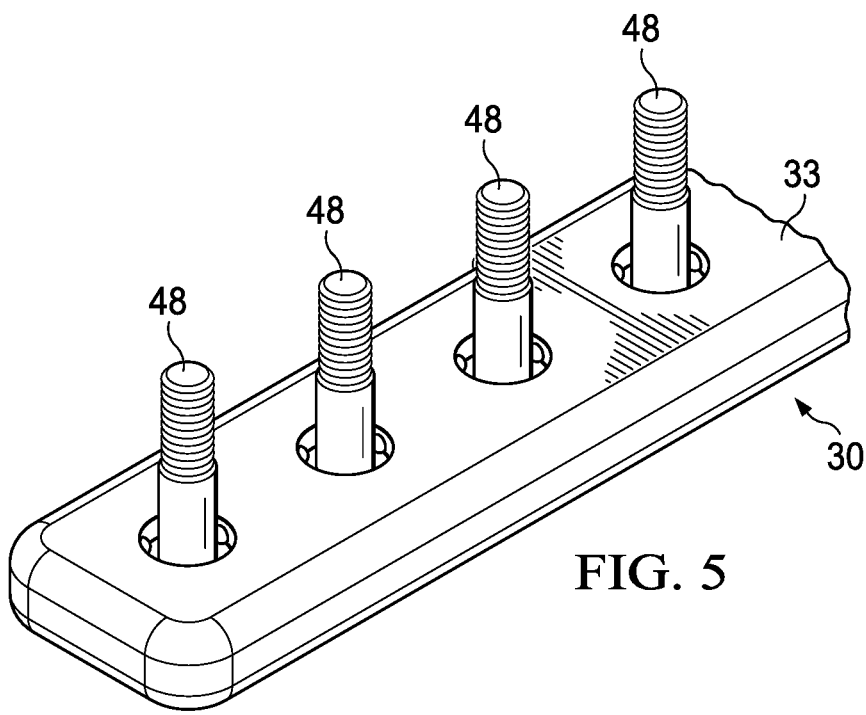
FIG. 5 is a perspective view of the support plate in FIG. 2 with fasteners in each of the least one connection members.
Figure 6:
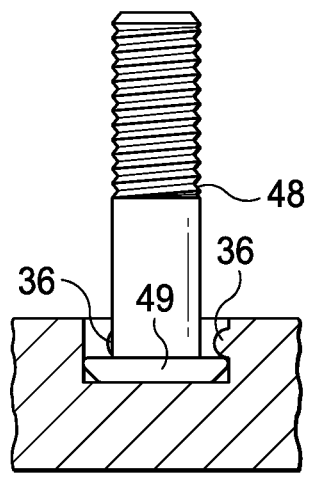
FIG. 6 is a cross-sectional view of a fastener in at least one connection member in FIG. 5.

In an embodiment, each connection member 32 is a recess 34 having a base 35 and at least one protrusion 36 extending from a side wall 38. The recess 34 extends from a front surface 33 into the body of the support plate 30. In some embodiments, the recess 34 is deep enough to secure the head 49 of fastener 48 therein. The at least one protrusion 36 is a surface 37 projecting beyond the side wall 38 that provides a snap fit to temporarily secure a fastener 48 in the recess 34. In some embodiments, there are one, two, three, or more protrusions 36 in each connection member 32. In an illustrative embodiment, as shown in FIG. 4, the side wall 38 are at about a 90 degree angle relative to the base 35. In other embodiments, the side wall 38 may be at an acute and/or an obtuse angle. In an embodiment, the head 49 of a fastener 48 is positioned into the recess 34 and held securely, but temporarily, in place by the at least one protrusion 36 (e.g., the fastener 48 is "snap fit" in the recess 34 by the at least one protrusion 36). Each connection member 32 is configured to secure a fastener 48 therein such that while the arm 22 is being positioned within the interior area, the fastener 48 will be retained therein. The least one connection member 32 can be adapted to securely hold various types of fastener shapes, sizes, and heads; for example, but not limitation, flush and countersunk fasteners. The least one connection member 32 permits a fastener 48 to be inserted quickly and easily therein, while also providing a quick release of the fastener 48 therefrom during fastening. Advantageously, the least one connection member 32 is configured to avoid dropping a fastener during installation and losing it on an aircraft, which can prevent foreign object damage to the interior area 16 of the aircraft.

The arrangement of the least one connection member 32 on the support plate 30 is tailored to align with at least one fastener hole 19 in the interior area 16. In an illustrative embodiment, shown in FIG. 1, a first plurality of connection members 31 includes four connection members 32 in a linear arrangement on the first fastening tool 20 to align with the at least one fastener holes 19 in the first side bracket 19a (as shown in FIG. 9A). Analogously, a second plurality of connection members 131 includes four connection members 132 in a linear arrangement on the second fastening tool 120 to align with the at least one fastener holes 19 in the second side 19a. In the illustrative embodiments, the at least one fastener holes 19 are disposed in a bracket in the interior area 16. In other embodiments, the at least one fastener hole 19 may be disposed in other areas in the interior area 16, for example, but not limitation, in the structure itself and internal components therein. It should be appreciated that the at least one connection member 32 can take on a wide variety of arrangements to align with the respective pattern of the at least one fastener holes 19. For example, but not limitation, the at least one connection members 32 can be arranged to align with at least one fastener holes 19 in different planes, non-linear arrangements (e.g., circular, star, etc.), dual fastener patterns, and the like.

In an embodiment, the support plate 30 is preferably a monolothic structure formed from any suitable polymeric material such as rubbers, elastomers, urethanes and polyurethane. In an embodiment, at least a portion of the support plate 30 is formed from a deformable material. For example, in an illustrative embodiment, the at least one protrusion 36 is constructed of a deformable material that can secure the head 49 of a fastener 48 in the connection member 32 during positioning of the fastening tool 20 and deform to release the head 49 of the fastener 48 during the fastening steps. In a preferred embodiment, the support plate 30 is formed of nylon by an SLS method. In some embodiments, the support plate 20 and arm 22 are formed as a monolithic structure.

The system 10 includes the image capturing device 40 disposed on the first end 22a of the arm 22 is configured to generate a captured image of the interior area 16 and communicate the captured image to the display device 60. The image capturing device 40 is capable of taking real time images while the support plate 30 is being positioned in the interior area 16 to assist clearance between internal components and the structure. In some embodiments, the image capturing device 40 is a camera 42, such as, but not limited to, a visible light video camera, infrared camera, heat sensitive camera, and/or other type of camera well-suited for at least one of the following: monitoring the interior area 16, locating the at least one fastener holes 19, and for aligning the at least one connection member 32 in the support plate 30 with the respective fastener holes 19. In an embodiment, the image capturing device 40 includes scanning or other devices that are capable of capturing three-dimensional images of the interior area 16. In an illustrative embodiment, the camera 42 is a conventional borescope camera including a lens assembly 43 for capturing the image and a mirror 44 to reflect the image of the fasteners 48 being positioned into the respective fastener holes 19 to the lens assembly. In an embodiment, the mirror 44 is oriented at about a 45 degree angle relative to the longitudinal axis of the camera 42. The image capturing device 40 is connected via wires 46 and/or through a network connectivity device 82 via a wireless network 80 to at least one of a display device 60 and a computer 86. In an embodiment, the computer 86 is in communication with the display device 60 and configured to transmit the captured image thereto. In some embodiments, the captured image from the image capturing device 40 is transmitted via wires or wireless network 80 directly to the display device 60.

In some embodiments, the image capturing device 40 is configured to be adjustable by receiving a video input 59 from the operator to adjust the captured image; for example, but not limitation, zooming out/in and/or moving the image capturing device to reposition the image being captured. Various types of video input devices may be used as a video input unit. The video input from the operator can be generated by the video input unit. In an embodiment, the video input unit can be a foot switch which is operable by the operator's foot. In some embodiments, the video input unit can be operated by the hand(s) and/or voice commands of the operator.

Figure 7:
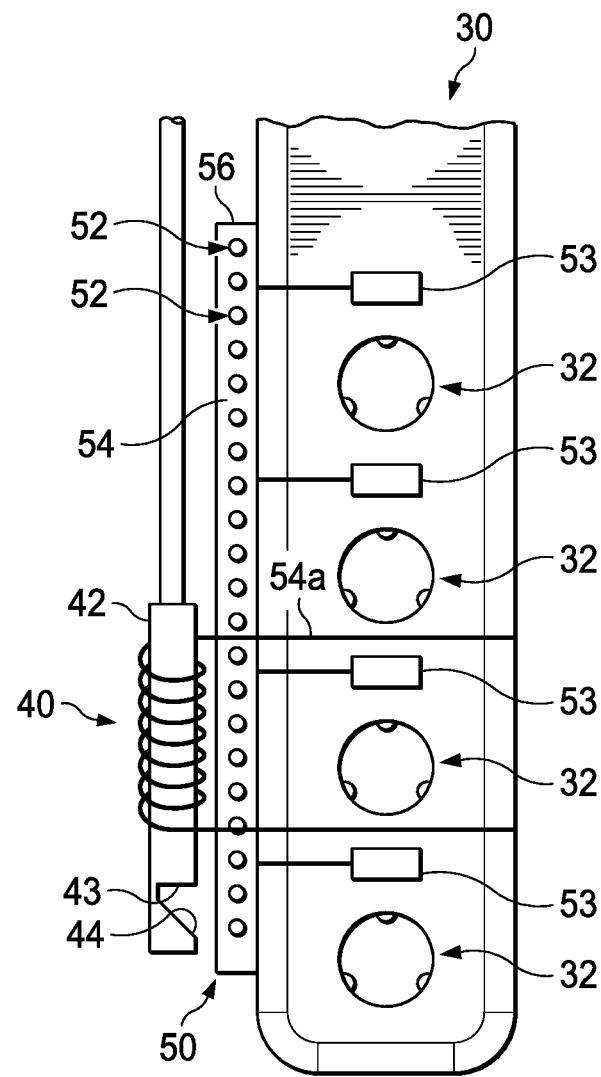
FIG. 7 is a front view of the first end of the fastening tool including the support plate, a light source, and an image capturing device.

The system 10 can include a light source 50 associated with the first end 22a of the arm 22. The light source 50 is configured to generate light at the first end 22a of the arm 22 sufficient to eliminate at least one of the following: the fastener 48, the at least one connection member, the at least one fastener hole 19, the interior area 16, and the at least one access opening 18. In an illustrative embodiment, the light source 50 includes at least one light emitting device 52, a support member 54, wires 56, a power source 57, and light input unit 58. In an embodiment, the light emitting device 52 can be comprised of light emitting diodes (LEDs) connected to the power source 57 via wires 56. The power source 57 can be a battery disposed under the handle 24 on the second end 22b of the arm 22. In an illustrative embodiment, the light emitting device 52 can be a plurality of bright white LEDs arranged in a linear pattern on a support member 54 disposed on the side of a first end 22a of the arm 22 via support wire 54a (e.g., support wire 54a is wrapped around both the support member 54 and the image capturing device 40), as shown in FIG. 7. In some embodiments, the light emitting device 52 is configured to generate various types of light (e.g., the light emitting device can generate at least two of the following: visible light, infrared light, and ultraviolet light).

The light source 50 is configured to be adjustable by receiving a light input from the operator to adjust the light characteristics (e.g., type of light, wavelength), the position of the light, and the quantity of the light; for example, but not limitation, selecting a desirable wavelength range (e.g., visible, infrared, ultraviolet), increasing/decreasing the light, and/or moving the light source to reposition the eliminated area. Various types of light input devices may be used as a light input unit 58. The light input from the operator can be generated by the light input unit 58. In an embodiment, the light input unit 58 can be a button or switch which is operable by the hands and/or voice commands of the operator.

In some embodiments, the light source 50 can include a laser 53 for generating an optical beam of light. A laser 53 is a device that emits light (e.g., electromagnetic radiation) through stimulated emission. The light output by the laser may be spatially coherent; that is, the light may be emitted in a narrow, low-divergence beam, or may be converted into one using optical components such as lenses. The laser 53 may emit light with a narrow wavelength spectrum. The laser 53 may emit visible light that a person is capable of perceiving. For instance, the laser 53 may be a small, visible-light laser that can assist positioning of the fastening tool 20 in the interior area 16, support plate 30 in the interior area 16, and/or the at least one connection member 32 to the at least one fastener hole 19 (for example, but not limitation, when aligned the beam will be parallel to the longitudinal axis of the respective fastener and/or transmitted into the at least one fastener hole 19. In some implementations, the laser 53 may produce a red beam or a green beam. The laser 53 may have low enough power that the projected beam presents a minimal hazard to eyes for incidental exposure. The laser 53 may display an illuminated line along the arrangement of the at least one connection members 32. In an embodiment, the laser 53 may display a spot in the at least one fastener hole 19 to assist with location of a fastener therein.

The system 10 includes a display device 60 located outside the interior area 16 for displaying the captured image of the interior area 16 to the operator. The display device 60 is preferably located at least at one place outside of the interior area 16. The display device 60 is configured in any suitable form, including, for example, Liquid Crystal Displays (LCD), Light emitting diode displays (LED), Cathode Ray Tube Displays (CRT) or any suitable type of display. The display device 60 may also serve as a user interface device if a touch screen display implementation is used. The display device 60 can transmit real time captured images of the interior area 16 to verify the location of the first fastening tool 20 and/or second fastening tool 120.

The system 10 can include the computer 86 that can be at least one of a desktop computer, a laptop computer, a cellular phone, a tablet computer, and the like. The computer 86 which includes a processor 86b. Processor 86b executes instructions and manipulates data to perform the operations of the computer 86 such as, for example, a central processing unit (CPU). Although FIG. 1 illustrates a single processor 86b in the computer 86, multiple processors 86b may be used according to particular needs and reference to the processor 86b is meant to include multiple processors 86b where applicable. As illustrated, the processor 86b includes the programming module 89a and the validation module 89b.

The programming module 89a can include any software, hardware, firmware, or combination thereof to automatically generate locating and fastening parameters for a structure and components associated therewith. For example, the programming module 89a may receive locating and fastening parameters 85 and image processing parameters 87 that can be used for analyzing the captured images by parameterization, digitization, and two or three dimensional models, which may be advantageous at least for verifying specification and quality control requirements.

The validation module 89b can include any software, hardware, firmware, or combination thereof configured to evaluate the fastening operations to ensure the installed fasteners meet specification and quality control requirements.

Network 80 facilitates wireless or wireline communication between the computer 86, display device 60, and image capturing device 40. Network 80 may communicate, for example, Internet Protocol (IP) packets, Frame Relay frames, Asynchronous Transfer Mode (ATM) cells, voice, video, data, and other suitable information between network addresses. Network 80 may include one or more local area networks (LANs), radio access networks (RANs), metropolitan area networks (MANs), wide area networks (WANs), all or a portion of the global computer network known as the Internet, and/or any other communication system or systems at one or more locations. As appropriate, the computer 86 generates requests and/or responses and communicates them to another client, user, server, or other computer systems located in or beyond network 80.

Figure 10:
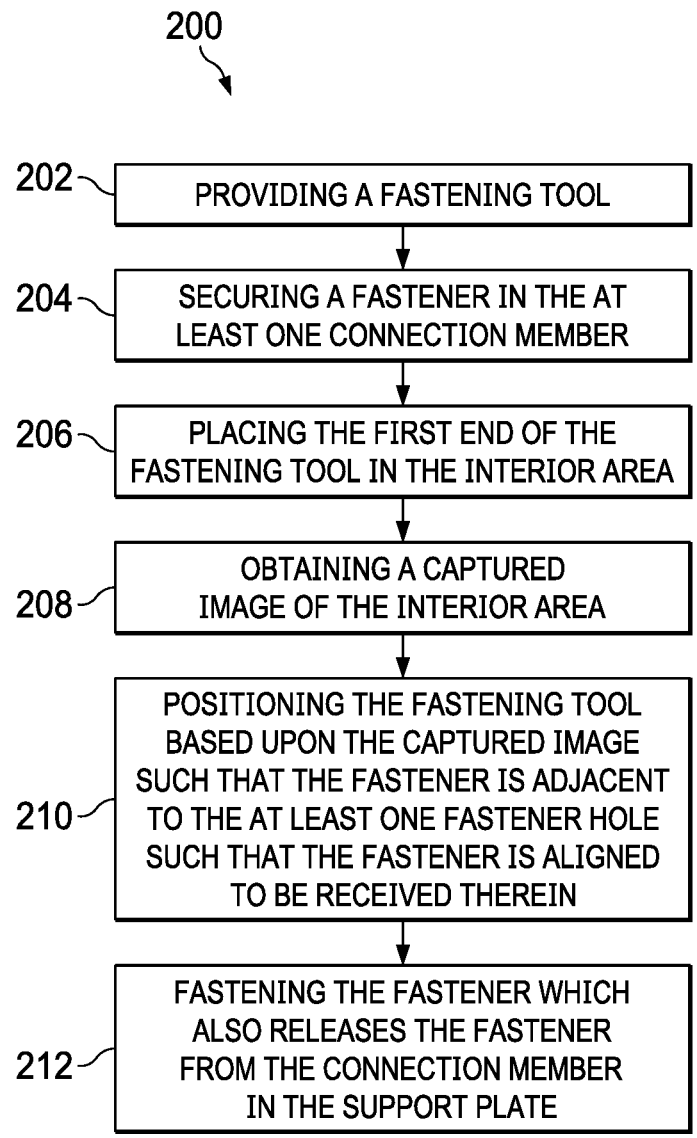
FIG. 10 is a method for image guided assembly of a structure.

In an embodiment, there is provided a method 200 for image guided assembly of a structure, as shown in FIG. 10. The operations of the method 200 may be performed by any combination of components of the system 20.

The method 200 can include at the following steps: a step 202 of providing a fastening tool, a step 204 of securing a fastener in the at least one connection member, a step 206 of placing the first end of the fastening tool in the interior area, a step 208 of obtaining a captured image of the interior area, a step 210 of positioning the fastening tool based upon the captured image such that the fastener is adjacent to the at least one fastener hole such that the fastener is aligned to be received therein, and a step 212 of fastening the fastener in the at least one fastener hole which also releases the fastener from the connection member in the support plate.

During step 206, at least a portion of the arm 22 (e.g., the first end 22a) of the fastening tool 20 is located inside the interior area 16 and at least a portion of the arm 22 (e.g., the second end 22b) extends through the access opening 18 and beyond the wing box 14 so that the handle 24 is located outside the interior area 16 for use by the operator. The fastening tool uses a snap feature to firmly but temporarily retain the fastener head therein. The arm of the fastening is rigid enough to snake through the interior area 16 without dislodging fasteners in the at least one connection member.

In an embodiment, step 210 includes using a laser 53 to assist positioning the fastening tool 20 and/or the support plate 30 in the interior area 16. In some embodiments, the step 210 can further include using a laser 53 to assist aligning the at least one connection member 32 with a respective hole 19 in the interior area 16.

In an embodiment, step 212 is achieved by securing the fastener in the at least one fastener hole from outside the interior area 16. For example, a worker positioned on the exterior of the side wall 14c in a securing area SA can position a tool such as a torque wrench or power tool in the cavity C of the side wall 14c. When torque is applied from the securing area the fastener is pulled from the connection member in the support plate and secured in the at least one fastener hole.

Methods, apparatuses, and systems described herein provide at least one of the following advantages: requires only one sided access for fastening the fastener in an interior area; permits installation of fasteners in difficult to reach areas; the fastening tool can be modified for different locations; avoids foreign object damage because the fastener is temporarily retained in the at least one connection member; easy to use; quick installation of a plurality of fasteners; and can be used out in the field for assembly, maintenance, repair and inspection.

The terms "a" and "an" are defined as one or more unless this disclosure explicitly requires otherwise.

The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "at least one" means "one or more."

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The term "generally" is defined as having an overall geometric shape that resembles the specified shape with slight deviations.

Terms such as "first" and "second" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A system for image guided assembly of a structure, the structure defining an interior area accessible through at least one access opening, the interior area including at least one fastener hole, the system comprising:
    a first fastening tool comprising:
        an arm including a first end and a handle disposed on a second end opposite the first end, at least a portion of the arm located inside the interior area, the handle located outside the interior area and guides the arm into the interior area through the at least one access opening; and
        a support plate disposed on the first end of the arm, the support plate comprising a body with a front surface and at least one connection member to securely retain a head of a fastener therein, the at least one connection member including a recess extending from the front surface into the body of the support plate to a base, a side wall between the base and the front surface, and at least one protrusion projecting beyond the side wall, the at least one protrusion provides a snap fit to temporarily secure the head of the fastener in the recess, the at least one connection member configured to facilitate alignment of the fastener with the at least one fastener hole;
    an image capturing device comprised of a borescope camera, the image capturing device disposed on the first end of the arm configured to generate a captured image of the interior area;
    a light source associated with the first end of the arm, the light source configured to generate light at the first end of the arm; and
    a display device located outside the interior area for displaying the captured image of the interior area.

2. The system according to claim 1, wherein the arm comprises a curvature shaped to correspond to the interior area.

3. The system according to claim 1, wherein the arm is rigid.

4. The system according to claim 1, wherein the arm is formed from an additive manufacturing process.

5. The system according to claim 4, wherein the additive manufacturing process comprises at least one of the following: electron beam melting, selective laser sintering, selective laser melting, stereolithography, direct metal laser sintering, three-dimensional printing, fused deposition modeling, laser curing and lasered engineered net shaping.

6. The system according to claim 1, wherein an arrangement of the at least one connection member on the support plate is tailored to align with the at least one fastener hole.

7. The system according to claim 1, wherein the borescope camera includes a lens assembly and a mirror oriented to reflect an image of the at least one fastener hole.

8. The system according to claim 1, wherein the light source is disposed on a side of the support plate.

9. The system according to claim 1, wherein the light source comprises a laser for generating an optical beam of light to assist with positioning of the fastening tool in the interior area.

10. The system according to claim 1, wherein the display device is at least one of a desktop computer, a laptop computer, a tablet computer, and a cellular phone.

11. The system according to claim 1, further comprising a second fastening tool.

12. The system according to claim 4, wherein the at least one protrusion is constructed of a deformable material.

13. The system according to claim 1, wherein the sidewall is at about a 90 degree angle relative to the base.

14. The system according to claim 1, wherein the sidewall is at an acute angle or obtuse angle relative to the base.

15. A fastening tool for assembly of a structure, the structure defining an interior area accessible through at least one access opening, the interior area including at least one fastener hole, the tool comprising:
    an arm including a first end and a handle disposed on a second end opposite the first end, at least a portion of the arm located inside the interior area, the handle located outside the interior area and guides the arm into the interior area through the at least one access opening; and
    a support plate disposed on the first end of the arm, the support plate comprising a body with a front surface and at least one connection member to temporarily retain a fastener therein, the at least one connection member comprises a recess extending from the front surface into the body of the support plate to a base, a side wall between the base and the front surface, and at least one protrusion projecting beyond the side wall, the at least one protrusion provides a snap fit to temporarily secure the head of the fastener in the recess, the at least one connection member configured to facilitate alignment of the fastener with the at least one fastener hole.

16. The fastening tool according to claim 15, wherein the arm comprises a curvature shaped to correspond to the interior area.

17. The fastening tool according to claim 15, wherein the arm is rigid.

18. The fastening tool according to claim 15, wherein an arrangement of the at least one connection member on the support plate is tailored to align with the at least one fastener hole.

19. The fastening tool according to claim 15, wherein the at least one protrusion is constructed of a deformable material.

20. The fastening tool according to claim 15, wherein the sidewall is at about a 90 degree angle relative to the base.

21. The fastening tool according to claim 15, wherein the sidewall is at an acute angle or obtuse angle relative to the base.

\* \* \* \* \*